US009813176B2

(12) United States Patent
Lanzone et al.

(10) Patent No.: US 9,813,176 B2
(45) Date of Patent: Nov. 7, 2017

(54) METHOD AND APPARATUS FOR FORMING AND PROCESSING DATA UNITS

(75) Inventors: Sergio Lanzone, Genoa (IT); Orazio Toscano, Genoa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 500 days.

(21) Appl. No.: 13/807,571

(22) PCT Filed: Aug. 23, 2010

(86) PCT No.: PCT/EP2010/062266
§ 371 (c)(1),
(2), (4) Date: Dec. 28, 2012

(87) PCT Pub. No.: WO2012/000565
PCT Pub. Date: Jan. 5, 2012

(65) Prior Publication Data
US 2013/0107894 A1 May 2, 2013

(30) Foreign Application Priority Data
Jun. 28, 2010 (EP) .................................... 10167470

(51) Int. Cl.
*H04J 3/14* (2006.01)
*H04J 3/16* (2006.01)
*H04J 3/06* (2006.01)
(52) U.S. Cl.
CPC .............. *H04J 3/14* (2013.01); *H04J 3/1652* (2013.01); *H04J 3/0647* (2013.01); *H04J 3/167* (2013.01)

(58) Field of Classification Search
None
See application file for complete search history.

(56) References Cited

U.S. PATENT DOCUMENTS 7,483,450 B1 * 1/2009 Giese et al. .................. 370/507
7,733,870 B1 * 6/2010 Liu ..................... H04L 12/5695
370/395.2

(Continued)

OTHER PUBLICATIONS

ITU-T G.709/Y.1331, "Interfaces for the Optical Transport Network," Series G: Transmission System and Media, Digital Systems and Networks, Feb. 2012.

(Continued)

*Primary Examiner* — Christopher Crutchfield
*Assistant Examiner* — Tito Pham
(74) *Attorney, Agent, or Firm* — Baker Botts, LLP

(57) ABSTRACT

The invention relates to data networks, and in particular relates to a method and apparatus for forming and processing data units to enable the transfer of clock quality information in data networks. A method of forming a higher order data unit, comprising payload data and overhead data, from a plurality of lower order data units, is disclosed. The payload of the higher order data unit is formed by combining the plurality of lower order data units. The overhead data of the higher order data unit includes clock quality information relating to clocks associated with the plurality of lower order data units. Embodiments provide a way of transporting clock quality information relating to clocks associated with a number of lower order data units within a single higher order data unit, and enables intermediate networks easily to access the clock quality information.

24 Claims, 11 Drawing Sheets

(56) References Cited

U.S. PATENT DOCUMENTS

| | | | |
|---|---|---|---|
| 2003/0025960 A1* | 2/2003 | Benvenuti et al. | 359/118 |
| 2008/0151941 A1* | 6/2008 | Ghodrat et al. | 370/503 |
| 2010/0172370 A1* | 7/2010 | Oku | H04J 3/0688 370/463 |

OTHER PUBLICATIONS

International Search Report for PCT/EP2010/062266 mailed.
EP Office Action mailed Mar. 5, 2014 in EP application 10744607.2.
International Telecommunication Union, ITU-T, G.798, Telecommunication Standardization Sector of ITU, Series G: Transmission Systems and Media, Digital Systems and Networks, Digital terminal equipments—Other terminal equipment, "*Characteristics of optical transport network hierarchy equipment functional blocks*", Recommendation ITU-T G.798. Dec. 2012.

\* cited by examiner

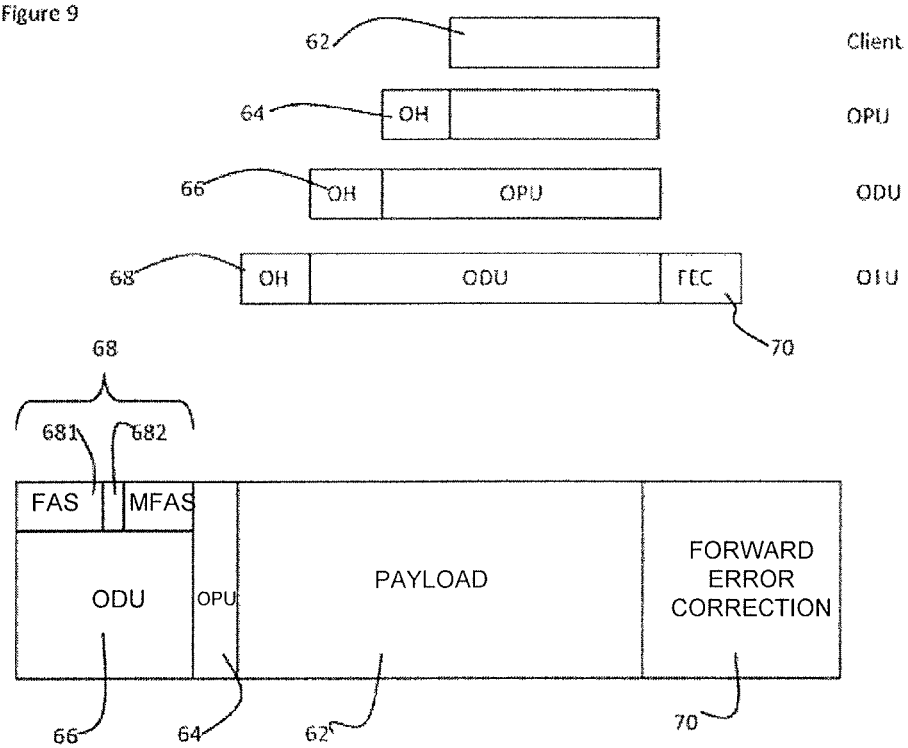

| Quality Level (QL) | SSM coding [MSB..LSB] | Priority |
|---|---|---|
| Quality PRC – the source is a PRC clock | 0010 | Highest |
| Quality SSUT – the source is a transit SSU clock | 0100 | |
| Quality SSUL – the source is a local SSU clock | 1000 | |
| Quality SEC – the source is a SEC clock | 1011 | |
| Quality DNU – the signal carrying this SSM must not be used for synchronisation | 1111 | Lowest |

Figure 13

METHOD AND APPARATUS FOR FORMING AND PROCESSING DATA UNITS

This application is the U.S. national phase of International Application No. PCT/EP2010/062266 filed 23 Aug. 2010 which designated the U.S. and claims priority to EP 10167470.3 filed 28 Jun. 2010, the entire contents of each of which are hereby incorporated by reference.

TECHNICAL FIELD

The present invention relates to data networks, and in particular relates to a method and apparatus for forming and processing data units to enable the transfer of clock quality information in data networks.

BACKGROUND

Network nodes of a data network are generally provided with a clock that is used to provide timing information to the network node, for example to provide timing information for the generation of outgoing data units by the network node.

In a synchronous data network, such as a Synchronous Optical Networking (SONET) network or a Synchronous Digital Hierarchy (SDH) network, the clocks of the nodes of the same network are synchronised. This may be achieved by the network nodes extracting clock timing information from signals received from other network nodes and using the extracted clock timing information to synchronise the clock of the network node to the received clock timing. Information about the quality of the clock used to generate the received signals may be included in the signals to enable a network node to select the highest quality received clock with which to synchronise.

In an asynchronous network, the network nodes typically have a local clock which is used when generating signals for onward transmission. However the local clocks of the network nodes are not synchronised with each other and therefore there is no need to extract clock quality information from received signals.

In some situations two synchronous networks may be connected together only by asynchronous networks. FIG. 1 shows a networks arrangement 2 in which a first synchronous network 4 and a second synchronous network 6 are connected via an asynchronous network 8. Network nodes 10 and 12 are edge nodes of the asynchronous network 8 and data sent from a network node 14 of the synchronous network 4 to the network node 16 of synchronous network 6 is routed via the network nodes 10 and 12.

Such a situation may arise, for example in the case of two synchronous SONET/SDH networks that are connected only by an asynchronous Optical Transport Network (OTN), for example using ITU-T G.709: Interfaces for the Optical Transport Network (OTN) standard.

It is desirable to be able to transfer both clock timing information and clock quality information between synchronous network nodes such as network node 14 and network node 16 via an asynchronous network 8.

The ITU-T G.709: Interfaces for the Optical Transport Network (OTN) standard has recently been enhanced to assure the timing transparency of the transported signals. As a result it is now possible to map signals from a synchronous network such as a SONET/SDH network 4 synchronously into a data unit for transport within a network 8 conforming to the ITU-T G.709: Interfaces for the Optical Transport Network (OTN) standard, for example at an edge node 10 shown in FIG. 1. The data unit may then be routed through the asynchronous network conforming to the ITU-T G.709: Interfaces for the Optical Transport Network (OTN) standard to edge node 12 as the entry point into a second SONET/SDH network 6. When the data unit reaches the edge node 12, the SONET/SDH network signal may be unmapped from the data unit of the network 8 conforming to the ITU-T G.709: Interfaces for the Optical Transport Network (OTN) standard in a synchronous manner so that the clock information is thus transported via the asynchronous OTN network 8 between the two synchronous networks 4, 6. However, there is currently no mechanism for transporting clock quality information over a network conforming to the ITU-T G.709: Interfaces for the Optical Transport Network (OTN) standard such as network 8 shown in FIG. 1.

In some data networks, a number of lower order data units, each lower order data unit having an associated clock, may be combined to form a higher order data unit. However, there is currently no mechanism for transporting clock quality information over a network in which a number of clocks may be associated with a data unit. An example of a network in which a number of lower order data units are multiplexed into a higher order data unit is a network conforming to the ITU-T G.709: Interfaces for the Optical Transport Network (OTN) standard.

It may be desirable for a network node to obtain clock quality information for clocks associated with data units received at the network node, in order to synchronise the network node local clock to a clock associated with a received data unit.

The present invention seeks to alleviate at least some of the problems of the prior art and to provide a method and apparatus for forming and processing data units having clock quality information.

SUMMARY

In accordance with a first aspect of the invention there is provided a method of forming a higher order data unit, comprising payload data and overhead data, from a plurality of lower order data units. In the method, the payload of the higher order data unit is formed by combining the plurality of lower order data units. The overhead data of the higher order data unit includes clock quality information relating to clocks associated with the plurality of lower order data units.

In accordance with a second aspect of the invention there is provided a network node for forming a higher order data unit, comprising payload data and overhead data, from a plurality of lower order data units. The network node has a payload processing unit coupled to receive a plurality of lower order data units and to combine the plurality of lower order data units to form the payload of the higher order data unit. The network node also has an overhead data generating unit arranged to receive clock quality information relating to clocks associated with the plurality of lower order data units and to form overhead data of the higher order data unit including the clock quality information.

BRIEF DESCRIPTION OF THE DRAWINGS

The invention will now be described by way of example with reference to the accompanying drawings:

FIG. 9 shows the logical structure of an exemplary data unit in a network conforming to the ITU-T G.709: Interfaces for the Optical Transport Network (OTN) standard;

FIG. 10 shows the arrangement of different elements within a data unit in accordance with an exemplary embodiment;

FIG. 13 shows the correspondence between a clock quality level, a quality level coding and a quality priority in accordance with an exemplary embodiment;

DETAILED DESCRIPTION

Embodiments of the invention enable information about the quality of clocks associated with a higher order data unit to be transported in the overhead data for the higher order data unit. Clock quality information can therefore be transported by a higher order data unit in addition to clock timing information. Embodiments of the invention make available a single monitoring point for the clock quality information for the clocks associated with lower order data units within a higher order data unit. One situation in which the availability of a single monitoring point for clock quality information is useful is in the selection of a clock associated with a received data unit for synchronization of a local network node clock.

The formation of a data unit in accordance with embodiments of the invention will now be described with reference to FIGS. 2-4. In the exemplary embodiment three lower order data units are combined to form a higher order data unit, for illustrative purposes. It will be apparent that the number of lower order units combined to form a higher order data unit may differ in different embodiments as selected by a skilled person.

Figure 1:
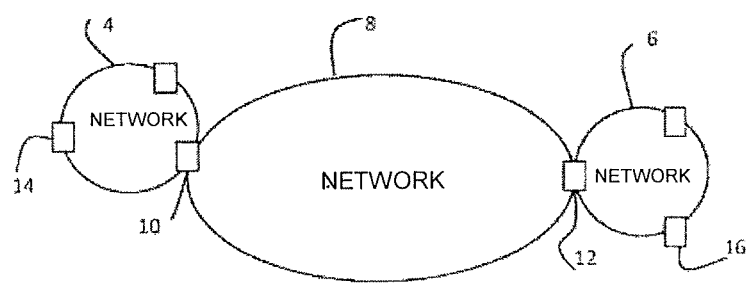
FIG. 1 shows a network arrangement.
Figure 2:
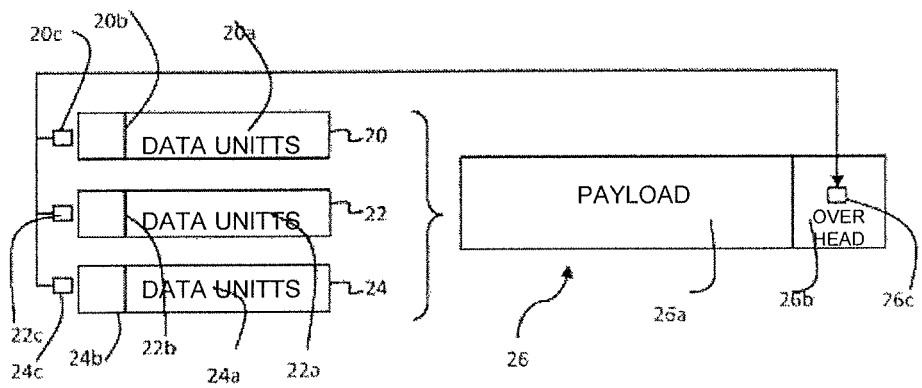
FIG. 2 illustrates the formation of a higher order data unit in accordance with embodiments of the invention.

In FIG. 2 three lower order data units 20, 22, 24 are shown. Each of the lower order data units 20, 22, 24 has a respective payload area 20a, 22a, 24a containing the data to be transported by the data unit and a respective overhead area 20b, 22b, 24b containing overhead data used by the network nodes during the transfer of the data unit across the data network, as will be known by a skilled person.

Associated with the lower order data units 20, 22, 24 are respective clock quality information 20c, 22c, 24c, relating to the quality of the clock used to form the respective lower order data unit. In some embodiments the clock quality information 20c, 22c, 24c is included in the overhead area 20b, 22b, 24b of the respective lower order data unit (not shown in FIG. 2).

A higher order data unit 26 is also shown, the higher order data unit 26 having a payload area 26a and an overhead area 26b.

As shown diagrammatically in FIG. 2, the lower order data units 20, 22, 24 may be combined together to form the payload 26a of the higher order data unit 26. In accordance with embodiments of the invention, the clock quality information 20c, 22c, 24c of the respective lower order data units 20, 22, 24 is inserted as lower order quality information 26c into the overhead data 26b of the higher order data unit 26.

Figure 3:
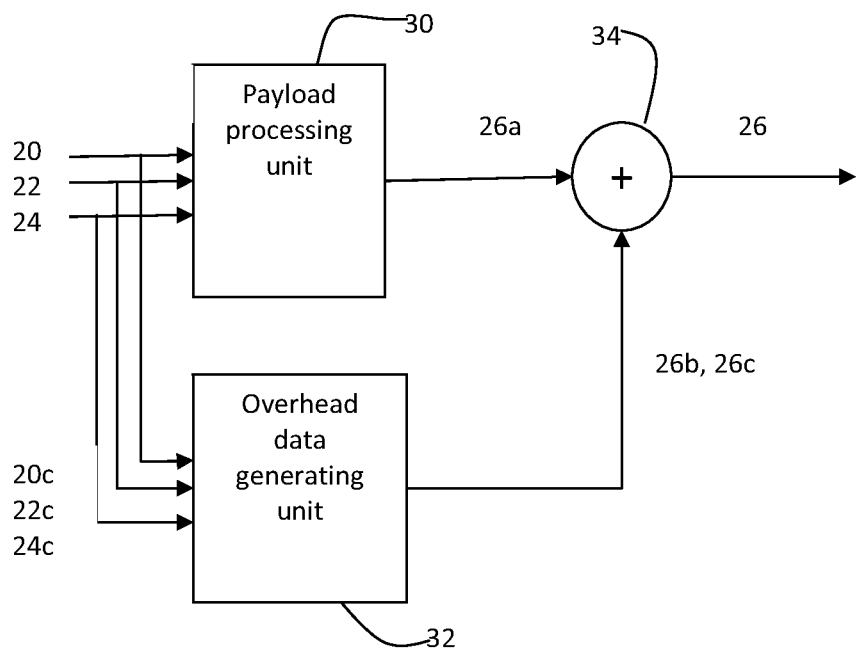
FIG. 3 shows a block diagram of processing elements required for formation of a higher order data unit in accordance with embodiments of the invention.

FIG. 3 shows a block diagram of processing elements required for embodiments of the invention. A payload processing unit 30 and an overhead data generating unit 32 are provided and are supplied respectively with the lower order data units 20, 22, 24 and the corresponding clock quality information 20c, 22c, 24c of the respective lower order data units 20, 22, 26. In some embodiments, such as the exemplary embodiment shown in FIG. 3, the clock quality information 20c, 22c, 24c is shown as being derived from the respective lower order data units 20, 22, 26, for example by reading the clock quality information 20c, 22c, 24c from the overhead area 20b, 22b, 24b of the respective lower order data unit 20, 22, 24.

The payload processing unit 30 combines the lower order data units 20, 22, 24 to form the payload 26a of higher order data unit 26. The overhead data generating unit 32 forms overhead data 26b of the higher order data unit 26, the overhead data 26b including clock quality information 26c relating to clocks associated with the lower order data units. The higher order data unit 26 comprises the payload 26a and the overhead data 26b including clock quality information 26c relating to clocks associated with the of lower order data units, the formation of the higher order data unit 26 being shown diagrammatically by the adder 34.

Figure 4:
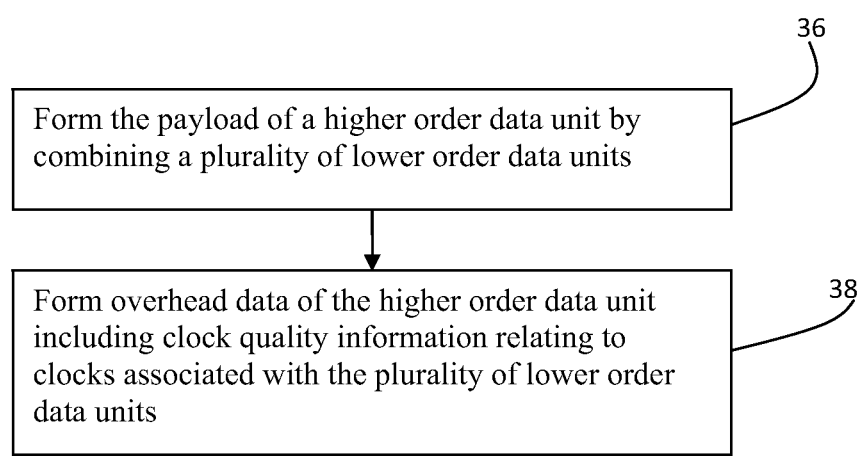
FIG. 4 shows a method of forming a higher order data unit in accordance with embodiments of the invention.

FIG. 4 shows a method of forming the higher order data unit in accordance with the exemplary embodiment.

In a first step 36 of FIG. 4, the payload of a higher order data unit 26 is formed by combining a plurality of lower order data units 20, 22, 24. In a second step 38 of FIG. 4, the overhead data 26b of the higher order data unit 26, including clock quality information 26c relating to clocks associated with the plurality of lower order data units 20, 22, 24, is formed.

A method and apparatus for processing a received higher order data unit and of obtaining data unit clock quality information there from will now be described with reference to FIGS. 5-7. The reference numerals used in FIGS. 5-7 for the same or similar elements are the same as reference numerals used in FIGS. 2-4, as will be appreciated by a skilled person.

Figure 5:
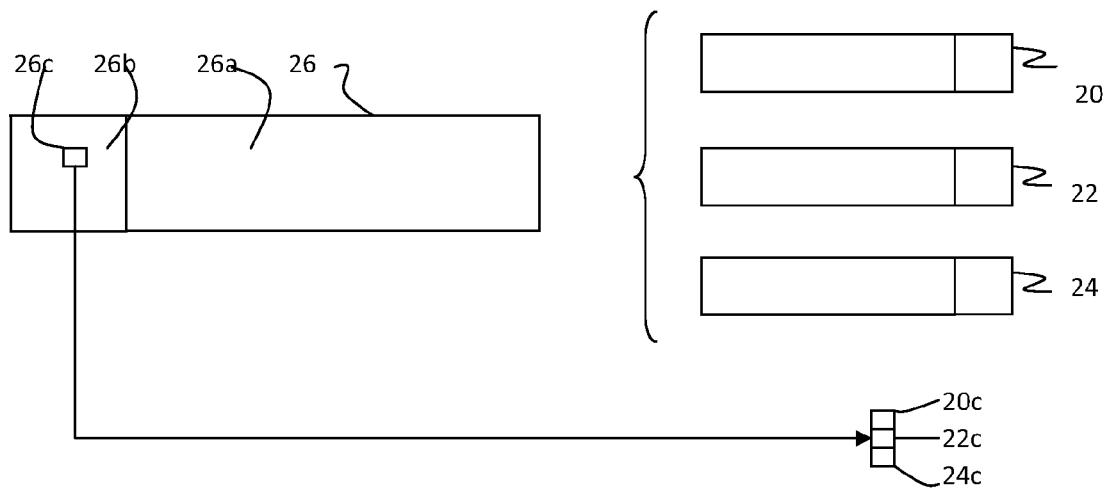
FIG. 5 illustrates the processing of a higher order data unit in accordance with embodiments of the invention.

In FIG. 5 a higher order data unit 26 is shown. The higher order data unit 26 has a payload area 26a and an overhead data area 26b including clock quality information 26c relating to clocks associated with the plurality of lower order data units 20, 22, 24 within the payload.

The higher order data unit 26 can be processed at a data network node in order to extract the plurality of lower order data units 20, 22, 24 from the higher order data unit payload 26a and to extract quality information 20c, 22c, 24c, relating to clocks associated with the plurality of lower order data units 20, 22, 24 within the payload 26a of the higher order data unit 26, from clock quality information 26c.

Figure 6:
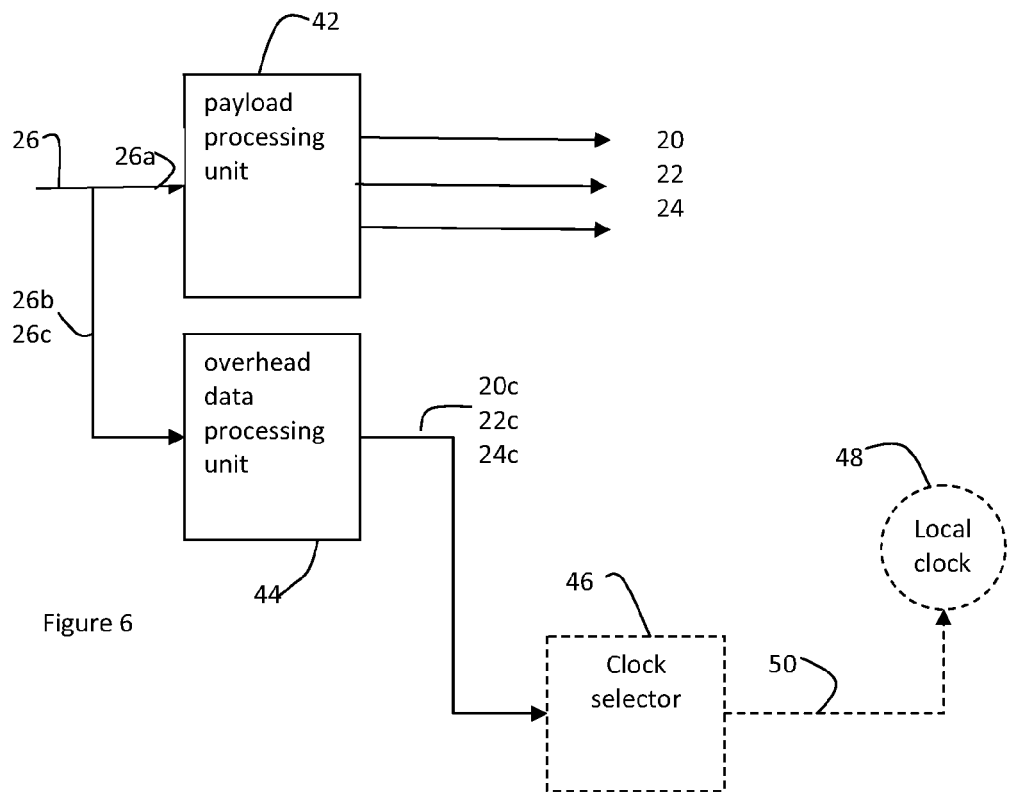
FIG. 6 shows a block diagram of processing elements required for processing of a higher order data unit in accordance with embodiments of the invention.

FIG. 6 shows a block diagram of processing elements of the network node in embodiments of the invention. The network node has a payload processing unit 42 and an overhead data processing unit 44, which are coupled to receive respectively the payload 26a of the higher order data unit 26 and the overhead data 26b, including the clock quality information 26c, of the higher order data unit 26.

The payload processing unit 42 receives the payload 26a of the higher order data unit 26 and processes the payload 26a to obtain the plurality of lower order data units 20, 22, 24 from the payload 26a.

The overhead data processing unit 44 receives the overhead data 26b, including the clock quality information 26c, and processes the overhead data 26b to obtain the clock quality information 20c, 22c, 24c for respective clocks associated with the plurality of lower order data units 20, 22, 24.

In some embodiments, as will be explained later with reference to the method shown in FIG. 8, the network node is also provided with a clock selector 46 arranged to receive the clock quality information 20c, 22c, 24c for respective clocks associated with the plurality of lower order data units 20, 22, 24. The network node is also provided with a local clock 48, or oscillator, which is arranged to receive a clock synchronisation signal 50 from the clock selector 46 and to use it as reference clock. Since not all embodiments of a network node will be provided with the clock selector 46, the clock selector 46, local clock 48 and synchronisation signal 50 are shown in dashed lines.

Figure 7:
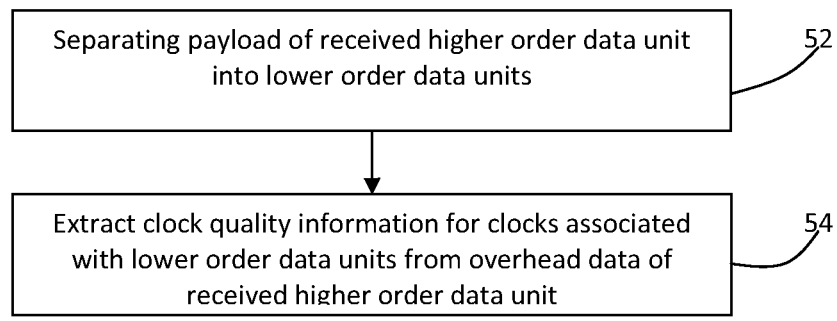
FIG. 7 shows a method of processing a higher order data unit in accordance with embodiments of the invention.

FIG. 7 shows a method of processing a higher order data unit in accordance with embodiments of the invention.

In step 52 the payload processing unit 42 receives the payload 26a of the higher order data unit 26 and separates the payload 26a of the received higher order data unit into the plurality of lower order data units 20, 22, 24.

In step 54, the overhead data processing unit 44 receives the overhead data 26b, including the clock quality information 26c, and extracts clock quality information 20c, 22c, 24c for clocks associated with the plurality of lower order data units 20, 22, 24 from the overhead data 26b of the received higher order data unit 26.

In some embodiments, as previously indicated, the clock quality information 20c, 22c, 24c may be used for selection of a clock with which to synchronise the local clock of the network node. FIG. 8 shows steps of a method of synchronisation of the local clock with a selected clock associated with a received lower order data unit.

Figure 8:
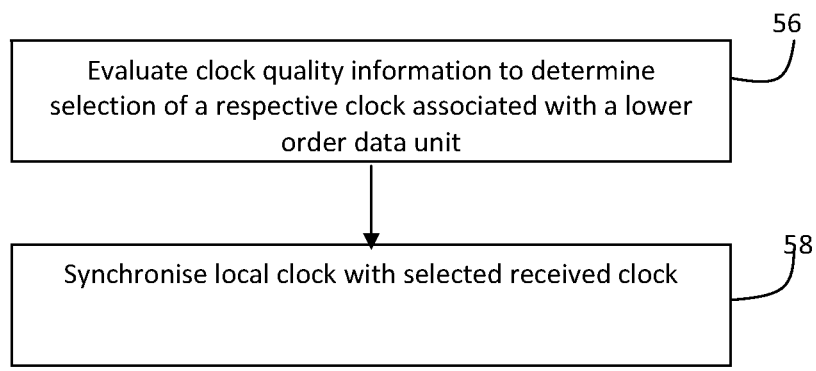
FIG. 8 shows a method of synchronisation of the local clock with a selected clock associated with a received lower order data unit in accordance with embodiments of the invention.

In a first step 56 of FIG. 8 the clock selector 46 evaluates clock quality information 20c, 22c, 24c to determine selection of a respective clock associated with a lower order data unit for local clock synchronisation. In step 58, in response to a clock selection in step 56, the clock selector 56 synchronises a local clock with the selected clock. In the exemplary arrangement shown in FIG. 6 this is achieved by means of a clock synchronisation signal 50 sent from the clock selector 46 to the local clock 48.

An exemplary embodiment of the invention will now be described with reference to FIGS. 9-17. The exemplary embodiment is described in the context of network conforming to the ITU-T G.709: Interfaces for the Optical Transport Network (OTN) standard, but it will be apparent to a skilled person that the other embodiments may be implemented within other networks.

Firstly, the data unit structure used in the network conforming to the ITU-T G.709: Interfaces for the Optical Transport Network (OTN) standard of the exemplary embodiment will now be described with reference to FIGS. 9-12.

FIG. 9 shows the logical structure of an exemplary data unit in a network conforming to the ITU-T G.709: Interfaces for the Optical Transport Network (OTN) standard. FIG. 10 shows the arrangement of the different parts of the exemplary data unit within a frame, as will be known to a skilled person.

With reference to FIG. 9, the client data to be transported across a link of network in the data unit may conform to any protocol, such as SONET/SDH or Ethernet protocols. The client data may be mapped synchronously or asynchronously into the client payload area 62 of the data unit.

An optical channel payload unit (OPU) is formed by adding an OPU overhead 64 to the client payload area 62 containing client data. This overhead information is used to support the various client signals carried within the client data area. For example, the OPU overhead 64 may provide information on the type of client transported and the mapping of client data into the client payload area 62. For example, the OPU overhead 64 may contain justification bits required for asynchronous mapping. The OPU overhead 64 also includes a payload structure identifier PSI which includes the payload type (PT), as will be discussed later in more detail.

An optical channel data unit (ODU) is formed from the optical payload unit OPU by adding the optical data unit ODU overhead 66. The optical channel data unit (ODU OH) may enable tandem connection monitoring (TCM) and path monitoring (PM) to be supported to provide fault location and allow end to end path supervision and monitoring of particular sections within the network.

Finally an optical transport unit (OTU) is formed by the addition of OTU overhead 68 and forward error correction (FEC) 70 to the optical data unit (ODU). The OTU overhead 68 is used to provide frame alignment information and to enable a multi-frame format to support transport via one or more optical channel connections.

The optical transport unit OTU is then transported using one or more optical channel connections, each optical channel typically being assigned a single optical wavelength.

FIG. 10 shows the arrangement of: the client payload area 62; OPU overhead 64; ODU overhead 66; OTU overhead 68; and FEC 70 within a single frame of an optical transport data unit OTU.

It will be appreciated that a single optical data unit ODU may span multiple optical transport data unit OTU frames. Accordingly, as will be known to a skilled person, the OTU overhead 68 of FIG. 9 typically includes a frame alignment overhead 681 in which a frame alignment signal FAS is defined. The OTU overhead 68 also comprises a multi-frame alignment signal MFAS 682, whose value is incremented with each OTU frame.

As will be appreciated by a skilled person, a single client signal may be mapped into the client payload area 62 of the optical payload unit OPU. The single client signal may be mapped synchronously into the client payload area 62 of the optical payload unit OPU, in which case the clock associated with the optical payload unit OPU is the clock associated to the client data. Alternatively, a single client signal may be mapped asynchronously into the client payload area 62 of the optical payload unit OPU, in which case the clock associated with the optical payload unit OPU is the local clock of the network element forming the optical payload unit OPU.

The ITU-T G.709: Interfaces for the Optical Transport Network (OTN) protocol allows several lower order optical data units LO-ODU to be combined together to form the client payload area 62 for a higher order optical payload unit HO-OPU. The higher order optical payload overhead is then added to form the higher order optical data unit HO-ODU; and then higher order optical transport unit overhead HO-OTU OH and FEC data is added to the higher order optical data unit HO-ODU to form the higher order transport unit HO-OTU for transport by an optical channel.

In accordance with embodiments of the invention, quality information relating to respective clocks associated with the lower order optical data units LO-ODUs within a higher order optical payload unit HO-OPU is inserted in the higher order optical payload unit overhead HO-OPU OH.

Figure 11:
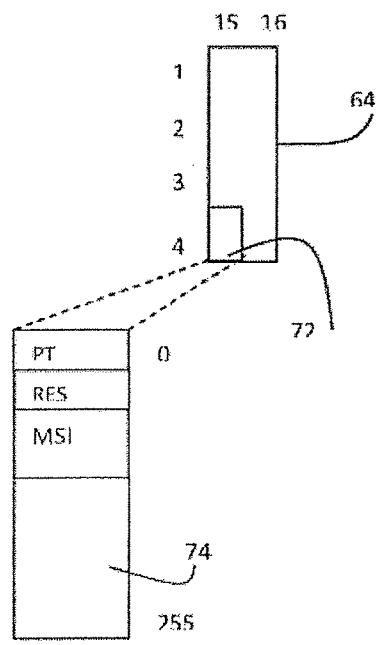
FIG. 11 shows an arrangement of overhead data for a data unit in accordance with an exemplary embodiment.

FIG. 11 shows an exemplary position for insertion of quality information within a data unit overhead in an exemplary embodiment implemented in a network conforming to ITU-T G.709: Interfaces for the Optical Transport Network (OTN). A skilled person will appreciate that the position of the quality information within the data unit overhead may differ in different embodiments.

In FIG. 11 the optical payload unit overhead 64 for a higher order optical payload unit HO-OPU, comprising a plurality of lower order optical data units LO-ODUs, is shown. The HO-OPU overhead 64 includes a payload structure identifier PSI 72 located at column 15 line 4 of the optical transport unit frame shown in FIG. 10. As discussed above, multiple optical transport unit frames may be needed to carry a higher order optical data unit HO-ODU and therefore the payload structure identifier PSI 72 is a multi-frame signal formed by a byte in each of the 256 frames of a multi-frame defined by the multi-frame alignment signal MFAS 682.

The multi-frame payload structure identifier PSI 72 includes a payload type (PT) designation to indicate the composition of the OPU signal i.e. the type of payload being carried in the OPU; reserved bytes; MSI bytes; and further reserved bytes 74. Quality information relating to clocks associated with the lower order optical data units LO-ODU carried by the higher order optical data unit HO-ODU may be inserted in these further reserved bytes in some embodiments.

Different types of payload and of optical payload unit have been defined for the G.709 OTN network. The number of bytes of the payload structure identifier PSI 72 allocated to different categories is set out below:

| OPU | Payload type | reserved | MSI | Reserved |
|---|---|---|---|---|
| OPU1 | 20 | 1 byte | 2 bytes | 252 bytes |
| OPU2 | 20 | 1 byte | 4 bytes | 250 bytes |
| OPU3 | 20 | 1 byte | 16 bytes | 238 bytes |
| OPU2 | 21 | 1 byte | 8 bytes | 246 bytes |
| OPU3 | 21 | 1 byte | 32 bytes | 222 bytes |
| OPU4 | 21 | 1 byte | 80 bytes | 174 bytes |

In accordance with embodiments of the invention some of the reserved bytes in the payload structure identifier PSI 72 may be allocated to carry quality information for the lower order optical data units.

As shown above, in all arrangements of higher order optical payload unit HO-OPU, in the multi-framed payload structure identifier PSI 72 there are enough bytes (indicated by the right hand "Reserved" column above) to carry the quality information of the clocks associated with the lower order optical data units LO-ODU.

Specifically:
for ODU1: 252 (PT=21) bytes are available for the transport of the quality information of the potential 2×LO-ODUjmultiplexed inside (i.e. 2 bytes needed);
for ODU2: 250 (PT=20) or 246 (PT=21) bytes are available for the transport of the quality information of the potential 8×LO-ODU multiplexed inside (i.e. max 8 bytes needed);
for ODU3 238 (PT=20) or 222 (PT=21) bytes are available for the transport of the quality information of the potential 32×LO-ODU multiplexed inside (i.e. max 32 bytes needed);
for ODU4: 174 (PT=21) bytes are available for the transport of the quality information of the potential 80×LO-ODU multiplexed inside (i.e. max 80 bytes needed).

In some embodiments of the invention, clock quality information relating to a clock used to create the higher order optical data unit may be inserted in the overhead data of the higher order data unit. The higher order optical data unit HO-ODUK is generated using the local clock in the exemplary embodiment described above with reference to FIG. 6.

Figure 12:
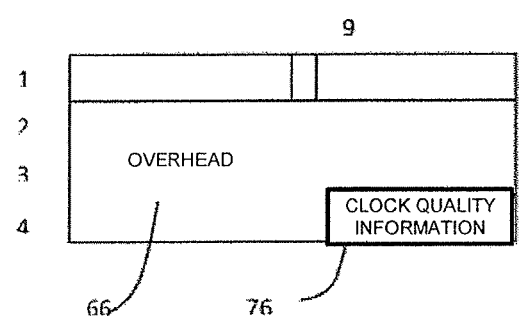
FIG. 12 shows an arrangement of overhead data for a data unit in accordance with an exemplary embodiment.

FIG. 12 shows an exemplary embodiment implemented in a network conforming to ITU-T G.709: Interfaces for the Optical Transport Network (OTN). A skilled person will appreciate that the position of the quality information within the data unit overhead may differ in different embodiments.

In FIG. 12 the optical data unit overhead 66 for a higher order optical data unit HO-ODUk, comprising a plurality of lower order optical data units LO-ODUks, is shown. Quality information relating to the clock used to create the optical data unit is inserted in the optical data unit overhead. In this exemplary embodiment the information relating to the clock used the create higher order optical data unit HO-ODUk is inserted in the optical data unit overhead 66 at column 9 line 4 of the optical transport unit frame shown in FIG. 10.

It should be noted that the above description is applicable to all the optical data units ODU not only to the higher order optical data units HO-ODU. Thus, every time an optical data unit ODU is generated (i.e. when a client is mapped in it or when a group of lower order optical data units LO-ODUk are multiplexed in it) the quality of the clock used to generate the optical data unit can be encoded in one byte of the optical data unit overhead ODUk OH.

In the exemplary embodiment the content of clock quality information 74 as above will depend on the quality level of the clocks associated with the respective lower order optical data units LO-ODU that are multiplexed in the higher order data unit HO-ODUk. In the exemplary embodiment the content of the clock quality information 76 will depend on the quality level of the clock used to form the optical data unit, whether that is a lower order optical data unit (LO-ODO) or a higher order data unit (HO-ODU). An example of how a quality level associated with a clock might be coded in clock quality information 74, 76 of the overhead data is shown in FIG. 13.

The implementation of an exemplary embodiment within a network conforming to the ITU-T G.709: Interfaces for the Optical Transport Network (OTN) standard will now be explained in more detail with reference to FIGS. 14-17. Much of the following description relates to network node elements, and the corresponding operation, which conform to the existing standards, and therefore a skilled person is directed to the ITU-T G.709: Interfaces for the Optical Transport Network (OTN) standard for further information.

Figure 14:
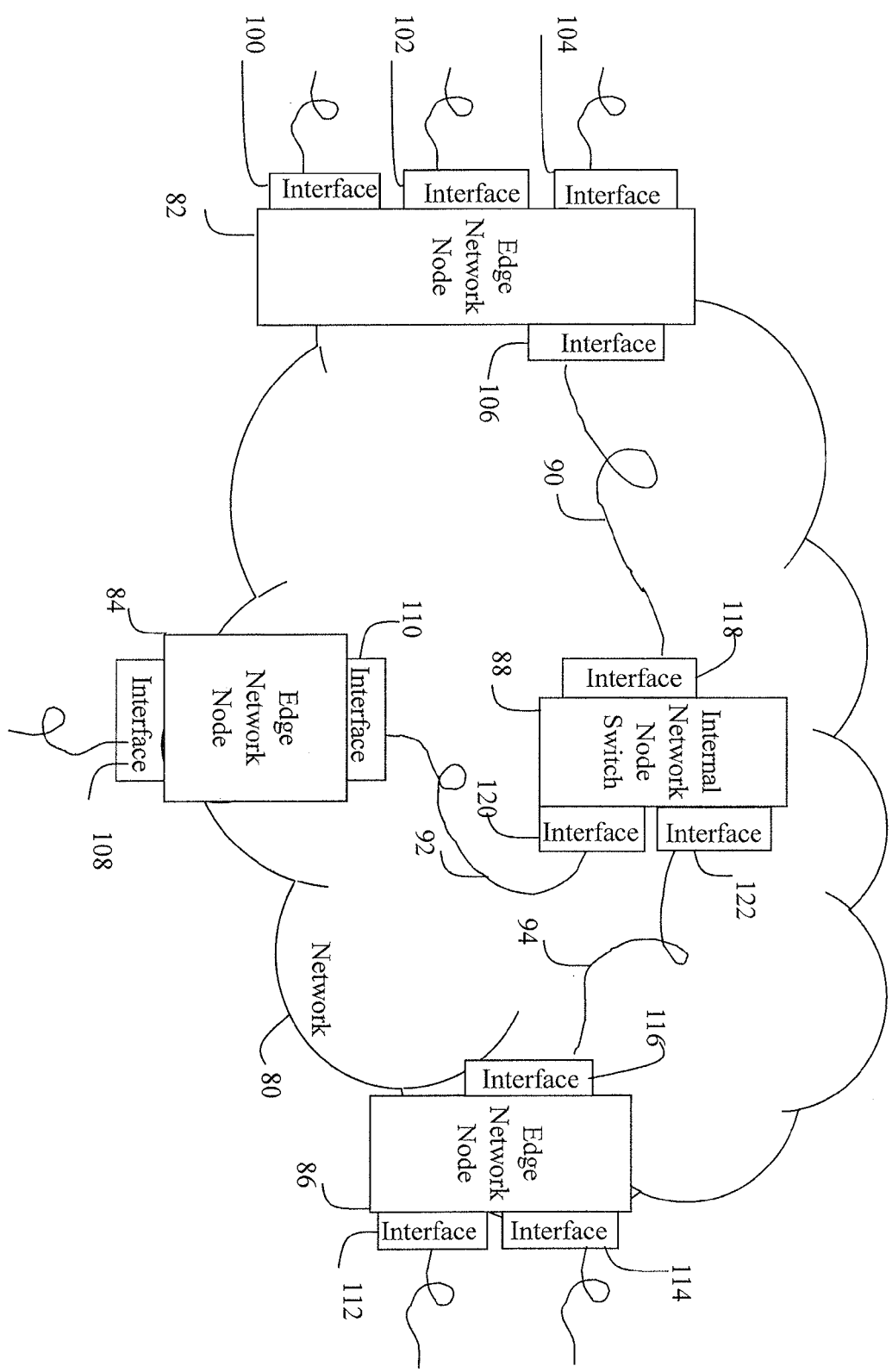
FIG. 14 shows elements of a network in accordance with an exemplary embodiment.

FIG. 14 shows elements of an exemplary network 80 conforming to the ITU-T G.709: Interfaces for the Optical Transport Network (OTN) standard. The exemplary network 80 has three edge network nodes 82, 84, 86 which provide an interface with the network 80, together with an internal network node 88, which provides amongst other things a switching service for data units travelling between the edge nodes 82, 84, 86 within the network 80. In this respect, the internal network node 88 is coupled to the edge network node 82 with an OTN link 90; the internal network node 88 is coupled to the edge network node 84 with an OTN link 92; the internal network node 88 is coupled to the edge network node 86 with an OTN link 94.

In the exemplary network 80 shown in FIG. 14, the edge network node 82 is supplied with three interfaces 100, 102, 104 for receiving data from and transmitting data to an additional network (not shown). The additional network may be, for example, a synchronous network. The edge network node 82 is also supplied with an interface 106 for communicating over OTN link 90 with the internal network node 88.

In the exemplary network 80 shown in FIG. 14, edge network node 84 is supplied with an interface 108 for receiving data from and transmitting data to an additional network (not shown). The additional network may be, for example, a synchronous network. The edge network node 84 is also supplied with an interface 110 for communicating over OTN link 92 with the internal network node 88.

In the exemplary network 80 shown in FIG. 14, edge network node 86 is supplied with two interfaces 112, 114 for receiving data from and transmitting data to an additional network (not shown). The additional network may be, for example, a synchronous network. The edge network node 86 is also supplied with an interface 116 for communicating over OTN link 94 with the internal network node 88.

The internal network node 88 is supplied with three interfaces 118, 120, 120 for communicating over respective OTN links 90, 92 and 94 with the edge network nodes 82, 84, 86.

Figure 15:
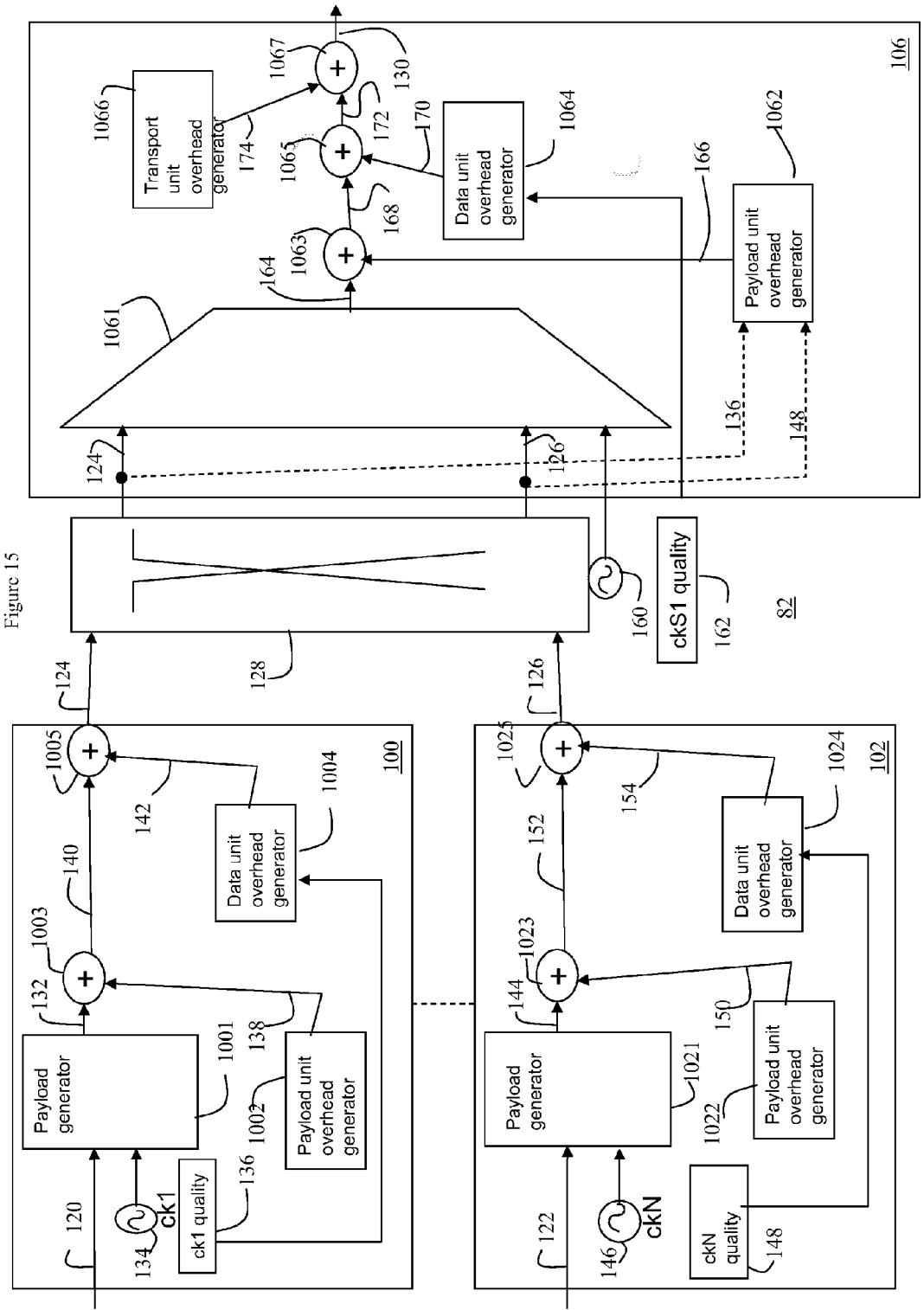
FIG. 15 shows a block diagram of components of an edge network node of the exemplary network shown in FIG. 14.

FIG. 15 shows a block diagram of components of an exemplary embodiment of the edge network node 82 required to form a higher order optical transport unit HO-OTU for sending on an optical channel over the OTN link 90 to internal network node 88.

The edge network node 82 receives a plurality of client signals CS1 . . . CSn, which are to be transported within the optical transport network. Only client signals CS1 and CSn have been shown in FIG. 15 for clarity, but it will be understood by a skilled person that other client signals may be processed in the same way as is shown for client signals CS1 and CSn.

In different embodiments the client signals CS1 and CSn may be received from a synchronous network such a SONET/SDH network or an Ethernet network, or may be received from an asynchronous network.

The client signal CS1 120 is processed by the interface 100 to form a lower order optical data unit LO-ODU1 124. Client signal CSn 122 is processed by the interface 102 to form a lower order optical data unit LO-ODUn 126, as will be explained hereafter.

The outputs of the interfaces 100, 102 are supplied to a switch 128, which supplies interface 106 with all lower order optical data units LO-ODU, including lower order optical data unit LO-ODU1 124 and lower order optical data unit LO-ODUn 126, which are to be sent on the OTN link 90 to internal network node 88. Interface 106 processes the received lower order data units to form a higher order optical transport unit HO-OTU 130, as will be explained hereafter. The higher order optical transport unit HO-OTU 130 may then be sent on an optical channel over the OTN link 90 to internal network node 88.

The interface 100 will now be described in more detail. Interface 100 has a payload generator 1001 for generating a lower order optical payload unit LO-OPU payload 132 from the input client signal CS1 120. The input client signal CS1 120 has an associated clock signal 134, having a corresponding clock quality 136, which is used by the payload generator 1001 in generating the lower order optical payload unit LO-OPU payload 132 when the client signal CS1 120 is mapped into the lower order optical payload unit LO-OPU payload 132 via synchronous mapping. In other embodiments, the client signal may be mapped asynchronously into the lower order optical payload unit LO-OPU payload 132 using the local system clock.

A lower order optical payload unit overhead generator 1002 generates a lower order optical payload unit overhead LO-OPU OH 138.

The lower order optical payload unit LO-OPU payload 132 and the lower order optical payload unit overhead LO-OPU OH 138 are combined in combiner 1003 to form a lower order optical payload unit 140.

A lower order optical data unit overhead generator 1004 generates a lower order optical data unit overhead data LO-ODU OH 142. In this exemplary embodiment, the lower order optical data unit overhead generator 1004 adds the clock quality information 136 relating to the quality of the clock 134 used by the payload generator 1001 to form the lower order optical payload unit LO-OPU payload 132.

The lower order optical payload unit 140 and the lower order optical data unit overhead data LO-ODU OH 142, which includes the clock quality information 136, are combined in the combiner 1005 to form the lower order optical data unit LO-ODU1 124 output by the interface 100.

In a similar manner, the client signal CSn 122 is processed by the interface 102 to form a lower order optical data unit LO-ODUn 126. The interface 102 will now be described in more detail.

Interface 102 has a payload generator 1021 for generating a lower order optical payload unit LO-OPU payload 144 from the input client signal CSn 122. The input client signal CSn 122 has an associated clock signal Ckn 146, having a corresponding clock quality 148, which is used by the payload generator 1021 in generating the lower order optical payload unit LO-OPU payload 144 when the client signal CSn 122 is mapped into the lower order optical payload unit LO-OPU payload 144 via synchronous mapping. In other embodiments, the client signal may be mapped asynchronously into the lower order optical payload unit LO-OPU payload 144 using the local system clock.

A lower order optical payload unit overhead generator 1022 generates a lower order optical payload unit overhead LO-OPU OH 150.

The lower order optical payload unit LO-OPU payload 144 and the lower order optical payload unit overhead LO-OPU OH 150 are combined in combiner 1023 to form a lower order optical payload unit 152.

A lower order optical data unit overhead generator 1024 generates a lower order optical data unit overhead data LO-ODU OH 154. In this exemplary embodiment, the lower order optical data unit overhead generator 1024 adds the clock quality information 148 relating to the quality of the clock 146 used by the payload generator 1021 to form the lower order optical payload unit LO-OPU payload 144.

The lower order optical payload unit 152 and the lower order optical data unit overhead data LO-ODU OH 154, which includes the clock quality information 148, are combined in the combiner 1025 to form the lower order optical data unit LO-ODU1 126 output by the interface 102.

The outputs of the interfaces 100, 102 are supplied to a switch 128, which supplies interface 106 with all lower order optical data units LO-ODU, including lower order optical data unit LO-ODU1 124 and lower order optical data unit LO-ODUn 126, which are to be sent on the OTN link 90 to internal network node 88.

The interface 106 has a multiplexer 1061 that receives the lower order optical data units, including lower order optical data unit LO-ODU1 124 and lower order optical data unit LO-ODUn 126, which are to be combined to form the higher order optical transport unit 130 to be sent on the OTN link 90 to internal network node 88. The multiplexer 1061 uses the system clock 160, having a corresponding clock quality 162, of the network node 82 to multiplex the received lower order optical data units LO-ODU to form a higher order optical data unit payload HO-OPU payload 164.

The payload unit overhead generator 1062 generates the higher order optical payload unit overhead HO-OPU OH 166. The clock quality information relating to clocks associated with lower order optical data units combined in the higher order optical data unit payload HO-OPU payload 164, for example the clock quality information 136 associated with lower order optical data unit LO-ODU1 124 and clock quality information 148 associated with lower order optical data unit LO-ODUn 126, is included by the payload unit overhead generator 1062 in the higher order optical payload unit overhead HO-OPU OH 166.

The higher order optical data unit payload HO-OPU payload 164 and the higher order optical payload unit overhead HO-OPU OH 166 are combined in the combiner 1063 to form the higher order optical payload unit HO-OPU 168.

A higher order optical data unit overhead generator 1064 generates a higher order optical data unit overhead data HO-ODU OH 170. In this exemplary embodiment, the higher order optical data unit overhead generator 1064 adds the clock quality information 162 relating to the quality of the clock 160 used by the multiplexer 1061 to form the higher order optical data unit overhead data HO-ODU OH 170.

The higher order optical payload unit HO-OPU 168 and the higher order optical data unit overhead data HO-ODU OH 170 are combined in the combiner 1065 to form the higher order optical data unit HO-ODU 172.

A higher order optical transport unit overhead generator 1066 generates a higher order optical transport unit overhead data HO-OTU OH 174. The higher order optical data unit HO-ODU 172 and the higher order optical transport unit overhead data HO-OTU OH 174 are combined in the combiner 1067 to form the higher order optical transport unit HO-OTU 130.

Figure 16:
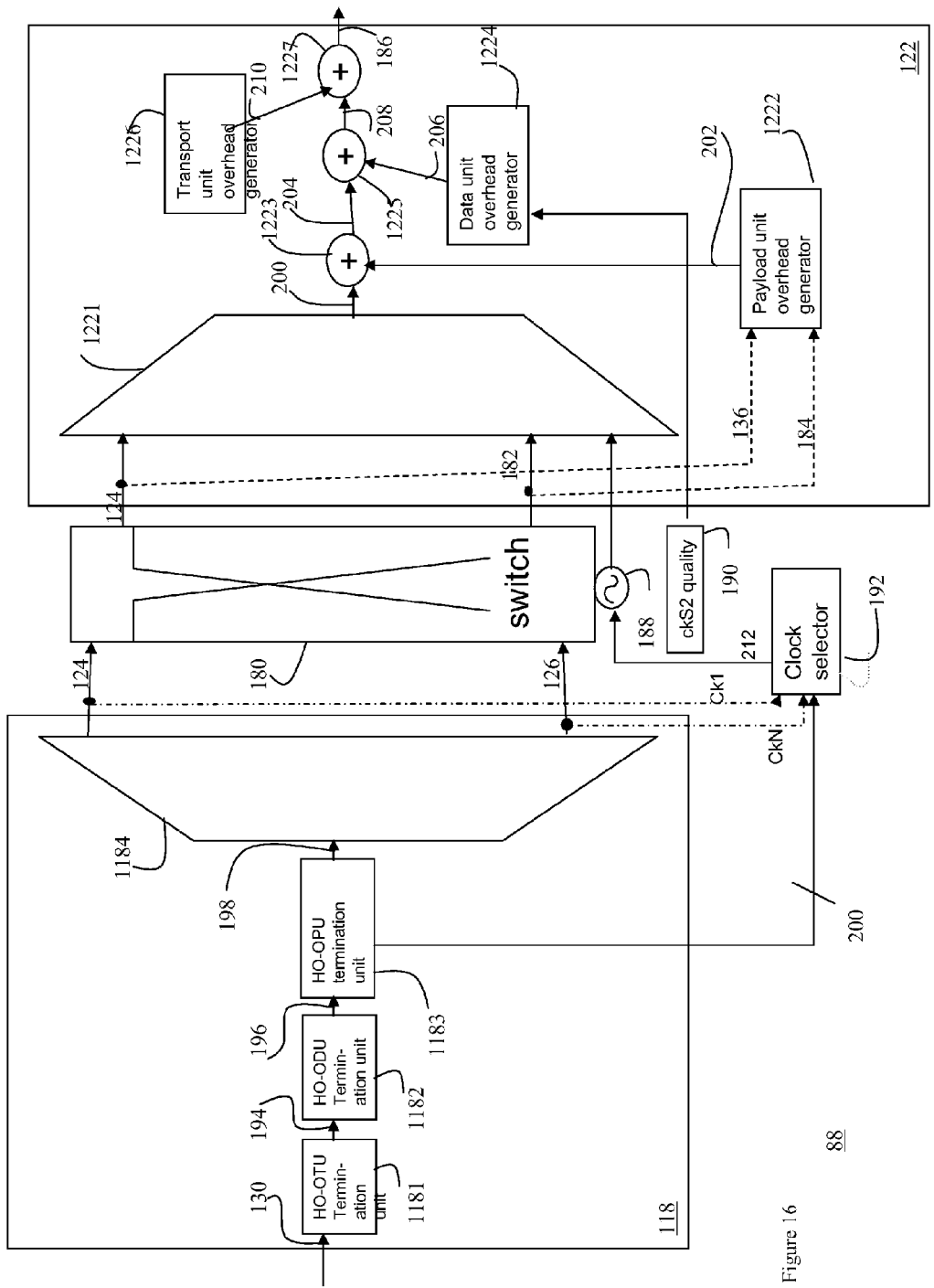
FIG. 16 shows a block diagram of components of an internal network node of the exemplary network shown in FIG. 14.

FIG. 16 shows a block diagram of components of an exemplary embodiment of the internal network node 88 having an interface 118 for terminating a higher order optical transport unit HO-OTU 130 received from an edge network node 82 to obtain a plurality of lower order data units LO-ODU. The interface 118 is coupled to a switch 180 for switching the lower order optical data units. The switch is coupled to an interface 122 to form the lower order optical data units LO-ODU to be sent in a higher order optical transport unit to a further network node. In this example, switching of lower order optical data units LO-ODU to network edge node 86 is shown.

Thus in the exemplary embodiment shown in FIG. 16, a received higher order optical transport unit HO-OTU 130 is terminated by interface 118 and the lower order optical data units LO-ODU, including the lower order optical data unit LO-ODU 124 and lower order optical data unit LO-ODU 126 are obtained from the received higher order optical transport unit HO-OTU 130.

The interface 118 passes the lower order optical data units LO-ODU, including the lower order optical data unit LO-ODU 124 and lower order optical data unit LO-ODU 126 to a switch 180. The switch 180 switches the lower order optical data units LO-ODU to the required destination, and in the exemplary embodiment the switch 180 supplied lower order data units LO-ODU including lower order optical data unit LO-ODU 126 and a lower order data unit LO-ODU 182, to interface 122. Interface 122 processes the received lower order data units to form a higher order optical transport unit HO-OTU 186, as will be explained hereafter. The higher order optical transport unit HO-OTU 186 may then be sent on an optical channel over the OTN link 94 to edge network node 86.

As shown, the lower order data unit LO-ODU 126 has clock quality information 136 associated therewith, and lower order data unit LO-ODU 182 has clock quality information 184 associated therewith.

In addition the internal network node 88 has a local system clock 188, having associated clock quality information ckS2 190, and a clock selector 192, which will be explained in more detail hereafter.

Interface 118 has an optical transport unit OTU termination unit 1181 for terminating a received higher order optical transport unit OTU 130. The optical transport unit OTU termination unit 1181 extracts the optical transport unit overhead HO-OTU OH from the received higher order optical transport unit HO-OTU 130 to obtain a higher order optical data unit HO-ODU 194.

The higher order optical data unit HO-ODU 194 is passed to an optical data unit ODU termination unit 1182 for terminating a higher order optical data unit ODU 194. The optical data unit ODU termination unit 1182 extracts the optical data unit overhead from the received higher order optical data unit ODU 194 to obtain a higher order optical payload unit HO-OPU 196.

The higher order optical payload unit HO-OPU 196 is passed to an optical payload unit OPU termination unit 1183 for terminating a higher order optical payload unit OPU 130. The optical payload unit OPU termination unit 1183 extracts the optical payload unit overhead OPU OH from the received higher order optical payload unit OPU 196 to obtain a higher order optical payload 198.

The optical payload unit overhead OPU OH contains clock quality information 200 for the lower order optical data units included in the higher order optical payload 198. This clock quality information 200, including clock information 136 for lower order optical data unit 124 and clock information 148 for lower order optical data unit 126, is extracted from the optical payload unit overhead OPU OH by the optical payload unit OPU termination unit 1183 and passed to the clock selector 192.

The higher order optical payload 198 is passed to a de-multiplexer 1184 for separating the higher order optical payload 198 into the constituent lower order data units, exemplified by the illustrated lower order optical data units 124 and 126, which are passed to switch 180.

The switch 180 switches the lower order optical data units LO-ODU to the required destination, and in the exemplary embodiment the switch 180 supplied lower order data units LO-ODU including lower order optical data unit LO-ODU 126 and a lower order data unit LO-ODU 182, to interface 122.

The interface 122 functions in generally the same manner as interface 106 as described above with reference to FIG. 15.

Interface 122 has a multiplexer 1221 that receives the lower order optical data units, including lower order optical data unit LO-ODU 124 and lower order optical data unit LO-ODU 182, which are to be combined to form the higher order optical transport unit 186 to be sent on the OTN link 94 to internal network node 86. The multiplexer 1221 uses the system clock 188, having a corresponding clock quality 190, of the network node 88 to multiplex the received lower order optical data units LO-ODU to form a higher order optical data unit payload HO-OPU payload 200.

The payload unit overhead generator 1222 generates the higher order optical payload unit overhead HO-OPU OH 202. The clock quality information relating to clocks associated with lower order optical data units combined in the higher order optical data unit payload HO-OPU payload 200, for example the clock quality information 136 associated with lower order optical data unit LO-ODU1 124 and clock quality information 184 associated with lower order optical data unit LO-ODU 182, is included by the payload unit overhead generator 1222 in the higher order optical payload unit overhead HO-OPU OH 202.

The higher order optical data unit payload HO-OPU payload 200 and the higher order optical payload unit overhead HO-OPU OH 202 are combined in the combiner 1223 to form the higher order optical payload unit HO-OPU 204.

A higher order optical data unit overhead generator 1224 generates a higher order optical data unit overhead data HO-ODU OH 206. In this exemplary embodiment, the higher order optical data unit overhead generator 1224 adds the clock quality information 190 relating to the quality of the clock 180 used by the multiplexer 1221 to form the higher order optical data unit overhead data HO-ODU OH 200.

The higher order optical payload unit HO-OPU 204 and the higher order optical data unit overhead data HO-ODU OH 206 are combined in the combiner 1225 to form the higher order optical data unit HO-ODU 208.

A higher order optical transport unit overhead generator 1226 generates a higher order optical transport unit overhead data HO-OTU OH 210. The higher order optical data unit HO-ODU 208 and the higher order optical transport unit overhead data HO-OTU OH 210 are combined in the combiner 1227 to form the higher order optical transport unit HO-OTU 186.

As mentioned previously, in the exemplary embodiment the clock selector 192 is supplied with the clock quality information 200 associated with the lower order optical data units, for example lower order optical data units LO-ODU 124, 126, within the received higher order optical data unit 130. Thus both clock quality information 136 and clock quality information 148 for lower order optical data units 124, 126 respectively which have been extracted from the higher order optical payload unit overhead are supplied by the HO-OPU termination unit 1183 to clock selector 192 as clock quality information 200.

The clock selector 192 evaluates the clock quality information and determines selection of a clock associated with the received lower order data unit for local clock synchronisation. In some embodiments the selection can be achieved by evaluating the clock quality information to determine the highest available clock quality, for example by comparing the received clock quality information, and selecting a received clock with the highest quality with which to synchronise the local clock 188. In some embodiments the clock selector 192 also compares the received clock quality information, for example clock quality information 136 and clock quality information 148 with the clock quality information 190 to determine whether a clock associated with any received lower order data unit is of a higher quality than the local clock 188.

In some embodiments the clock selector 192 examines the quality information of all the possible clock sources to which the local clock 188 might be synchronised. The quality information can be one of the values shown in FIG. 13. The clock selector will decide to use as a synchronisation source of the system the received clock with the highest quality level.

If the clock selector 192 determines selection of a clock associated with the received lower order data unit for local clock synchronisation, the clock selector 192 synchronises the local clock 188 with the selected clock by sending a synchronisation signal 212 to the local clock 188. In the exemplary embodiment the clock selector 192 obtains access to the selected clock, for example Ck1, CkN as shown in FIG. 16 and sends the selected clock as a reference clock as the synchronisation signal 212 to the local clock 188.

Figure 17:
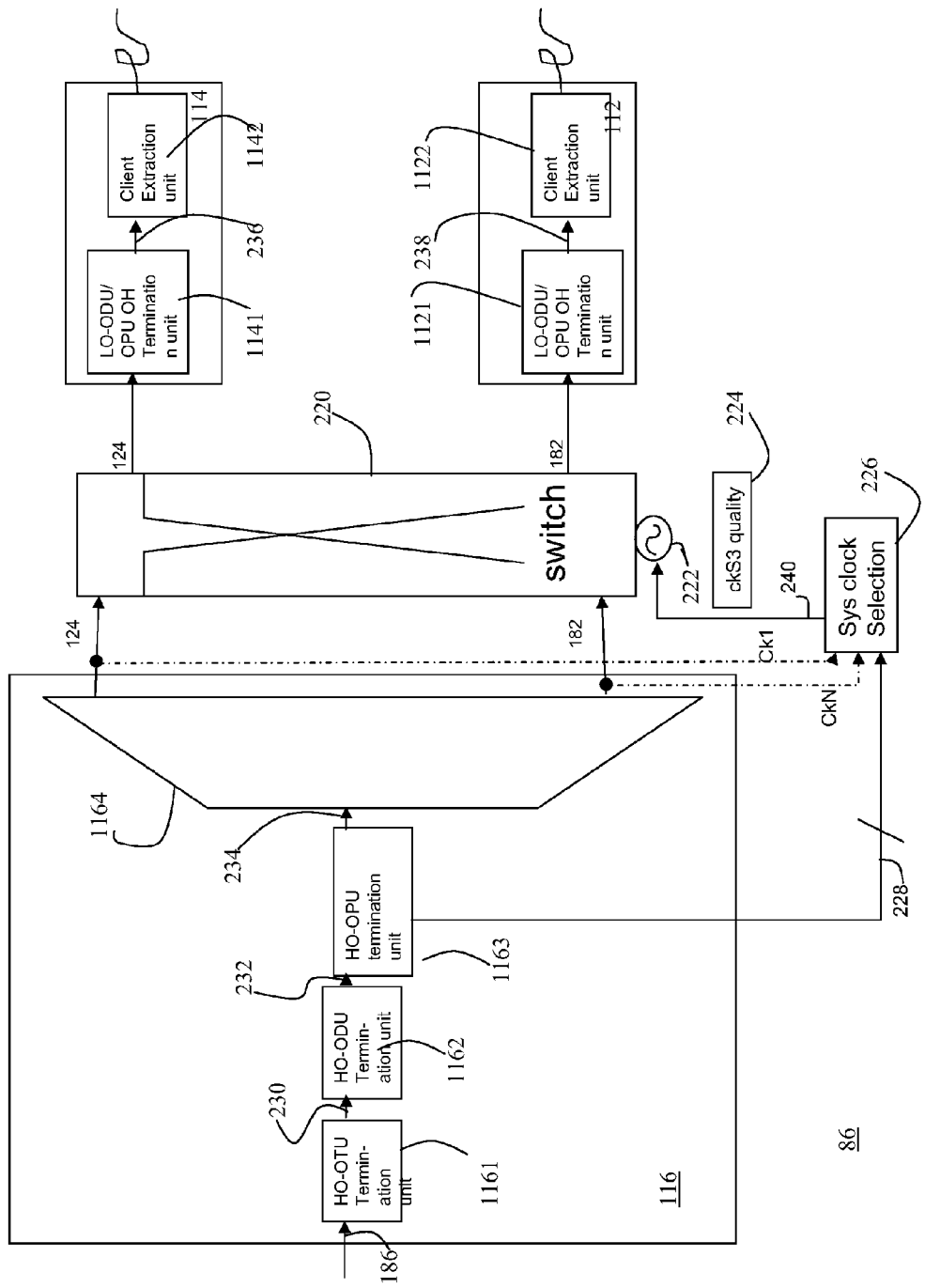
FIG. 17 shows a block diagram of components of an edge network node of the exemplary network shown in FIG. 14.

FIG. 17 shows a block diagram of components of an exemplary embodiment of the edge network node 86.

The network node 86 has an interface 116 for receiving a higher order optical data unit HO-OTU 186, and the received higher order optical transport unit HO-OTU 186 is terminated by interface 118. The lower order optical data units LO-ODU, including the lower order optical data unit LO-ODU 124 and lower order optical data unit LO-ODU 182 are obtained from the received higher order optical transport unit HO-OTU 186.

The interface 116 passes the lower order optical data units LO-ODU, including the lower order optical data unit LO-ODU 124 and lower order optical data unit LO-ODU 186 to a switch 220. The switch 220 switches the lower order optical data units LO-ODU to the required destination. In the exemplary embodiment the switch 220 supplies lower order data units LO-ODU to interfaces 114 and 112 to obtain the client data from the payload of the lower order optical data unit LO-ODU 124 and lower order optical data unit LO-ODU 186 respectively for onward transmission in a bordering network.

As previously discussed, the lower order data unit LO-ODU 126 has clock quality information 136 associated therewith, and lower order data unit LO-ODU 182 has clock quality information 184 associated therewith. The clock quality information 136 and 184 are included in the optical payload unit overhead data for the higher order optical payload unit 186 transporting the lower order data unit LO-ODU 126 and the lower order data unit LO-ODU 182.

In addition the internal network node 88 has a local system clock 222, having associated clock quality information ckS3 224, and a clock selector 226, which will be explained in more detail hereafter.

Interface 116 has an optical transport unit OTU termination unit 1161 for terminating a received higher order optical transport unit HO-OTU 186. The optical transport unit OTU termination unit 1161 extracts the optical transport unit overhead HO-OTU OH from the received higher order optical transport unit HO-OTU 186 to obtain a higher order optical data unit HO-ODU 230.

The higher order optical data unit HO-ODU 230 is passed to an optical data unit ODU termination unit 1162 for terminating a higher order optical data unit ODU 230. The optical data unit ODU termination unit 1162 extracts the optical data unit overhead from the received higher order optical data unit HO-ODU 230 to obtain a higher order optical payload unit HO-OPU 232.

The higher order optical payload unit HO-OPU 232 is passed to an optical payload unit OPU termination unit 1163 for terminating a higher order optical payload unit OPU 232. The optical payload unit OPU termination unit 1163 extracts the optical payload unit overhead OPU OH from the received higher order optical payload unit OPU 232 to obtain a higher order optical payload 234.

As will be explained in more detail below clock quality information for the lower order optical data units included in the higher order optical payload 234, including clock information 136 for lower order optical data unit 124 and clock information 148 for lower order optical data unit 152, is extracted from the optical payload unit overhead OPU OH and passed to the clock selector 192.

The optical payload unit overhead OPU OH contains clock quality information 228 for the lower order optical data units included in the higher order optical payload 234. This clock quality information 228, including clock quality information 136 for lower order optical data unit 124 and clock information 184 for lower order optical data unit 182, is extracted from the optical payload unit overhead OPU OH by the optical payload unit OPU termination unit 1163 and passed to the clock selector 226.

The higher order optical payload 234 is passed to a de-multiplexer 1164 for separating the higher order optical payload 234 into the constituent lower order data units, exemplified by the illustrated lower order optical data unit LO-ODU 124 and lower order optical data unit LO-ODU 182.

The lower order optical data unit LO-ODU 124 is passed by switch 220 to interface 114. Interface 114 comprises a lower order data unit and payload unit overhead termination unit 1141 coupled to a client extraction unit 1142. In operation the lower order optical data unit LO-ODU 124 is passed to the lower order data unit and payload unit overhead termination unit 1141, which carries out termination of the lower order optical data unit and optical payload units resulting in the client payload data 236. The client payload data 236 is passed to the client extraction unit 1142, which creates client data for onward transport in another network.

Similarly, the lower order optical data unit LO-ODU 182 is passed by switch 220 to interface 112. Interface 112 comprises a lower order data unit and payload unit overhead termination unit 1121 coupled to a client extraction unit 1122. In operation the lower order optical data unit LO-ODU 182 is passed to the lower order data unit and payload unit overhead termination unit 1121, which carries out termination of the lower order optical data unit and optical payload units resulting in the client payload data 238. The client payload data 238 is passed to the client extraction unit 1122, which creates client data for onward transport in another network.

As mentioned previously, in the exemplary embodiment the clock selector 226 is supplied with the clock quality information 228 associated with the lower order optical data units, for example lower order optical data units LO-ODU 124, 182, within the received higher order optical data unit 186. Thus both clock quality information 136 and clock quality information 184 for lower order optical data units 124, 182 respectively which have been extracted from the higher order optical payload unit overhead are supplied by the HO-OPU termination unit 1163 to clock selector 226 as clock quality information 228.

The clock selector 226 evaluates the clock quality information and determines selection of a clock associated with the received lower order data unit for local clock synchronisation. In some embodiments the selection can be achieved by evaluating the clock quality information to determine the highest available clock quality, for example by comparing the received clock quality information, and selecting a received clock with the highest quality with which to synchronise the local clock 222. In some embodiments the clock selector 226 also compares the received clock quality information, for example clock quality information 136 and clock quality information 184 with the clock quality information 224 to determine whether a clock associated with any received lower order data unit is of a higher quality than the local clock 222.

In some embodiments the clock selector 226 examines the quality information of all the possible clock sources to which the local clock 222 might be synchronised. The quality information can be one of the values shown in FIG. 13. The clock selector will decide to use as a synchronisation source of the system the received clock with the highest quality level.

If the clock selector 226 determines selection of a clock associated with the received lower order data unit for local clock synchronisation, the clock selector 226 synchronises the local clock 222 with the selected clock by sending a synchronisation signal 240 to the local clock 222. In the exemplary embodiment the clock selector 226 obtains access to the selected clock, for example Ck1, CkN as shown in FIG. 17 and sends the selected clock as a reference clock as the synchronisation signal 240 to the local clock 222.

Different embodiments may be implemented in software or in hardware or in a combination of software and hardware as selected by a skilled person. In addition, functions shown may be grouped differently in different embodiments without affecting functionality provided, as will be apparent to a skilled person.

Modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of forming a higher order data unit in an Optical Transport Network (OTN), comprising payload data and overhead data, from a plurality of lower order data units, comprising the steps of:

forming, by a first network node, the payload of the higher order data unit in the OTN by combining payload data from a respective payload area of each of the plurality of lower order data units; and forming, by the first network node, overhead data of the higher order data unit in the OTN, the overhead data comprising clock quality information relating to a plurality of clocks, each of the plurality of clocks associated with a respective one of the plurality of lower order data units, wherein forming the overhead data comprises:

for each of the plurality of clocks associated with a respective one of the plurality of lower data units, inserting corresponding clock quality information into a payload structure identifier in a frame of at least one reserved portion of an overhead data portion of the higher order data unit in the OTN.

2. The method as claimed in claim 1 further including the step of inserting clock quality information for the local clock used to create the higher order data unit in the overhead data of the higher order data unit.

3. The method as claimed in claim 1 further comprising the step of arranging the higher order data unit as a multi-frame data unit, and including clock quality information at a clock quality position within the higher order data unit overhead in a plurality of frames of the multi-frame data unit.

4. The method as claimed in claim 1 further comprising the step of transmitting the higher order data unit from the first network node to a second network node via an asynchronous network.

5. The method as claimed in claim 4 further comprising the step of receiving the payload data from at least one synchronous network.

6. The method as claimed in claim 1, further comprising the step of, for each of the plurality of clocks, mapping the corresponding clock quality information in the at least one reserved portion of the overhead portion of the higher order data unit to a corresponding portion of payload data in the payload of the higher order data unit.

7. A method of obtaining data unit clock quality information comprising the steps:

separating, by a first network node, the payload of a received higher order data unit in an Optical Transport Network (OTN) into a plurality of constituent lower order payload data units; and for each of a plurality of clocks associated with a respective one of the plurality of lower data units, extracting, by the first network node, clock quality information from a payload structure identifier in a frame of at least one reserved portion of an overhead data portion of the received higher order data unit in the OTN, each of the plurality of clocks being associated with a respective one of the plurality of constituent lower order data units.

8. The method as claimed in claim 7, further comprising the step of extracting clock quality information for the local clock used to create the higher order data unit from the overhead data of the higher order data unit.

9. The method as claimed in claim 7 further comprising the steps of arranging the higher order data unit as a multi-frame data unit, and including clock quality information at a clock quality position within the higher order data unit overhead in a plurality of frames of the multi-frame data unit.

10. The method as claimed in claim 7, further comprising the steps of:

evaluating the extracted clock quality information to determine selection of a respective clock associated with a lower order data unit for local clock synchronization; and in response to a clock selection, synchronizing a local clock with the selected clock.

11. The method as claimed in claim 7, further comprising the step of receiving the higher order data unit from a second network node via an asynchronous network.

12. The method as claimed in claim 11, further comprising the step of transmitting, by the first network node, plurality of constituent lower order payload data units via at least one synchronous network.

13. The method as claimed in claim 7, further comprising the step of, mapping each of the plurality of constituent lower order payload data units to a portion of clock quality information for an associated one of the plurality of clocks in the at least one reserved portion of the overhead portion of the higher order data unit.

14. A first network node for forming a higher order data unit in an Optical Transport Network (OTN), comprising payload data and overhead data, from a plurality of lower order data units, the first network node comprising software stored on a non-transitory computer-readable medium, the software operable when executed to cause the first network node to:

receive a plurality of lower order data units, each of the plurality of lower order data units comprising a payload area and an overhead area;

combine a respective payload area of each of the plurality of lower order data units to form the payload of the higher order data unit in the OTN; and form overhead data of the higher order data unit in the OTN, the overhead data comprising clock quality information relating to a plurality of clocks, each of the plurality of clocks associated with a respective one of the plurality of lower data units, wherein the overhead data is formed by:

for each of the plurality of clocks associated with a respective one of the plurality of lower data units, inserting corresponding clock quality information into a payload structure identifier in a frame of at least one reserved portion of an overhead data portion of the higher order data unit in the OTN.

15. The network node as claimed in claim 14 wherein the software is further operable when executed to cause the first network node to insert clock quality information for the local clock used to create the higher order data unit in the overhead data of the higher order data unit.

16. The first network node as claimed in claim 14 wherein the software is further operable when executed to cause the first network node to:

arrange the higher order data unit as a multi-frame data unit; and include clock quality information at a clock quality position within the higher order data unit overhead in a plurality of frames of the multi-frame data unit.

17. The first network node as claimed in claim 14 wherein the software is further operable when executed to cause the first network node to:

receive the payload data from at least one synchronous network; and transmit the higher order data unit from the first network node to a second network node via an asynchronous network.

18. The first network node as claimed in claim 14, wherein the software is further operable when executed to cause the first network node to map, for each of the plurality of clocks, the corresponding clock quality information in the at least one reserved portion of the overhead portion of the higher order data unit to a corresponding portion of payload data in the payload of the higher order data unit.

19. A first network node for processing a received higher order data unit in an Optical Transport Network (OTN), comprising payload data and overhead data, the first network node comprising software stored on a non-transitory computer-readable medium, the software operable when executed to cause the first network node to:
- receive the payload data of the received higher order data unit in the OTN and to separate the payload data into a plurality of constituent lower order payload data units; and
- for each of a plurality of clocks associated with a respective one of the plurality of lower data units, extract clock quality information from a payload structure identifier in a frame of at least one reserved portion of an overhead data portion of the received higher order data unit in the OTN, each of the plurality of clocks being associated with a respective one of the plurality of constituent lower order data units.

20. The first network node as claimed in claim 19 further comprising:
- a local clock;
- wherein the software is further operable when executed to cause the first network node to:
  - receive the clock quality information relating to respective clocks associated with the lower order data units;
  - evaluate the clock quality information to determine selection of a respective clock associated with a lower order data unit;
  - synchronize the local clock to the selected clock in response to a clock selection.

21. The first network node as claimed in claim 20, wherein the software is further operable when executed to cause the first network node to extract clock quality information for the local clock used to create the higher order data unit from the overhead data of the higher order data unit.

22. The first network node as claimed in claim 20, wherein the software is further operable when executed to cause the first network node to:
- arrange the higher order data unit as a multi-frame data unit; and
- include clock quality information at a clock quality position within the higher order data unit overhead in a plurality of frames of the multi-frame data unit.

23. The first network node as claimed in claim 19, wherein the software is further operable when executed to cause the first network node to:
- receive the higher order data unit from a second network node via an asynchronous network; and
- transmit, by the first network node, the plurality of constituent lower order payload data units via at least one synchronous network.

24. The first network node as claimed in claim 19, wherein the software is further operable when executed to cause the first network node to map each of the plurality of constituent lower order payload data units to a portion of clock quality information associated for an associated one of the plurality of clocks in the at least one reserved portion of the overhead portion of the higher order data unit.

\* \* \* \* \*